(12) United States Patent
Ferre Fabregas et al.

(10) Patent No.: US 11,120,648 B2
(45) Date of Patent: Sep. 14, 2021

(54) HEALTH SELF LEARNING SYSTEM AND METHOD FOR ELECTRICAL DISTRIBUTION SYSTEMS FOR AUTOMATED DRIVING VEHICLES

(71) Applicant: Lear Corporation, Southfield, MI (US)

(72) Inventors: Antoni Ferre Fabregas, Valls (ES); David Gamez Alari, Valls (ES); Federico Giordano, Valls (ES); Jordi Tost Bartolome, Valls (ES)

(73) Assignee: LEAR CORPORATION, Southfield, MI (US)

( * ) Notice: Subject to any disclaimer, the term of this patent is extended or adjusted under 35 U.S.C. 154(b) by 429 days.

(21) Appl. No.: 16/155,455

(22) Filed: Oct. 9, 2018

(65) Prior Publication Data

US 2020/0111272 A1  Apr. 9, 2020

(51) Int. Cl.
*G07C 5/08* (2006.01)
*G05B 19/048* (2006.01)
(Continued)

(52) U.S. Cl.
CPC ......... *G07C 5/0808* (2013.01); *G05B 19/048* (2013.01); *G05D 1/0088* (2013.01); *G07C 5/008* (2013.01); *G07C 5/085* (2013.01); *H04W 4/44* (2018.02); *G05B 2219/24015* (2013.01); *G05B 2219/25257* (2013.01); *G05B 2219/2637* (2013.01)

(58) Field of Classification Search
CPC ...... G07C 5/0808; G07C 5/085; G07C 5/008; G05B 19/048; G05B 2219/24015; G05B 2219/25257; G05B 2219/2637; G05B 19/042; G05B 23/0283; H04W 4/44; G05D 1/0088; B60R 16/0238; G06N 20/00

See application file for complete search history.

(56) References Cited

U.S. PATENT DOCUMENTS 6,738,697 B2   5/2004   Breed
6,745,151 B2   6/2004   Marko et al.
(Continued)

OTHER PUBLICATIONS

Everis, "everis Connected Car Report", NTT Data Company, Dec. 8, 2016, 25 pages.
(Continued)

*Primary Examiner* — Russell Frejd
(74) *Attorney, Agent, or Firm* — Brooks Kushman P.C.

(57) ABSTRACT

In at least one embodiment, an apparatus for adaptively performing diagnostics in a vehicle is provided. The apparatus includes at least one microcontroller and a communication controller. The at least one microcontroller is positioned in a vehicle and is configured to provide first information indicative of operating characteristics for at least one switch in the vehicle. The communication controller is configured to receive the first information from the at least one microcontroller and to wirelessly transmit the first information to a remote server. The communication controller is further configured to receive second information related to a remaining useful life (RUL) for the at least one switch from the remote server and to transmit the second information to the at least one microcontroller to determine when the at least one switch will exhibit a failure.

19 Claims, 4 Drawing Sheets

(51) Int. Cl.
  *G07C 5/00* (2006.01)
  *H04W 4/44* (2018.01)
  *G05D 1/00* (2006.01)

(56) References Cited

U.S. PATENT DOCUMENTS

| | | |
|---|---|---|
| 6,933,842 B2 | 8/2005 | Oesterling et al. |
| 7,286,047 B2 | 10/2007 | Oesterling et al. |
| 7,308,614 B2 * | 12/2007 | Kojori ................ G05B 23/0289 |
| | | 701/33.8 |
| 7,532,963 B1 | 5/2009 | Lowrey et al. |
| 8,374,745 B2 | 2/2013 | Zhang et al. |
| 8,560,165 B2 | 10/2013 | Salman et al. |
| 8,849,497 B2 | 9/2014 | Zhang et al. |
| 8,995,412 B2 | 3/2015 | Moeller et al. |
| 9,240,082 B2 | 1/2016 | Marathe et al. |
| 9,384,597 B2 | 7/2016 | Koch et al. |
| 2011/0082621 A1 * | 4/2011 | Berkobin ................ B60L 58/10 |
| | | 701/31.4 |
| 2011/0190956 A1 * | 8/2011 | Kunst ....................... G06F 1/28 |
| | | 700/292 |
| 2018/0316082 A1 * | 11/2018 | Keller, III ................ H01Q 3/02 |

OTHER PUBLICATIONS http://www.telematics.com/board-diagnostics-future-vehicle-analysis/, "On-Board Diagnostics: The future of vehicle analysis", 2015, 6 pages.

Future of Privacy Forum, "The Connected Car and Privacy Navigating New Data Issues", Nov. 13, 2014, 13 pages.

* cited by examiner

Fig-5

HEALTH SELF LEARNING SYSTEM AND METHOD FOR ELECTRICAL DISTRIBUTION SYSTEMS FOR AUTOMATED DRIVING VEHICLES

TECHNICAL FIELD

Aspects disclosed herein generally relate to a health self-learning system and method for electrical distribution system for automated driving vehicles. These aspects and others will be discussed in more detail herein.

BACKGROUND

U.S. Pat. No. 8,374,745 to Zhang et al. discloses a system and method for telemetrically collecting on-road vehicle diagnostic data. In one embodiment, the method includes collecting vehicle diagnostic data from service shops, on-road vehicles and warranty records, aggregating the collected data and extracting knowledge therefrom. The extracted knowledge can be used to enhance algorithms on-board vehicles or at service centers so as to better identify vehicle faults and provide enhanced diagnostics and prognostics. The enhanced algorithms can then be used to provide predictive maintenance suggestions, provide trouble shooting assistance or provide vehicle design improvements.

SUMMARY

In at least one embodiment, an apparatus for adaptively performing diagnostics in a vehicle is provided. The apparatus includes at least one microcontroller for being positioned in a vehicle and the at least one microcontroller is configured to provide first information indicative of operating characteristics for at least one switch in the vehicle. The communication controller is configured to receive the first information from the at least one microcontroller and to wirelessly transmit the first information to a remote server. The communication controller is further configured to receive second information related to a remaining useful life (RUL) for the at least one switch from the remote server based on the first information and to transmit the second information to the at least one microcontroller to determine when the at least one switch will exhibit a failure.

In at least another embodiment, a computer-program product embodied in a non-transitory computer read-able medium that is programmed for adaptively performing diagnostics in a vehicle is provided. The computer-program product includes instructions for receiving first information indicative of operating characteristics for at least one switch in the vehicle and for wirelessly transmitting the first information to a remote server. The computer-program product includes instructions for receiving second information related to a remaining useful life (RUL) for the at least one switch from the remote server based on the first information; and for transmitting the second information to the at least one microcontroller to determine when the at least one switch will exhibit a failure.

In at least another embodiment, an apparatus for adaptively performing diagnostics is provided. The apparatus includes a memory and a remote server. The remote server includes the memory and is configured to wirelessly receive first information indicative of operating characteristics for at least one switch from a plurality of vehicles and to generate second information related to a remaining useful life (RUL) for the at least one switch for the plurality of vehicles based on the first information. The remote server is further configured to wirelessly transmit the second information to the plurality of vehicles to determine when the at least one switch will exhibit a failure for each corresponding vehicle of the plurality of vehicles.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a computer-program that is embodied in a non-transitory computer readable medium programmed to perform any number of the functions as disclosed.

With the advent of Automated Driven Vehicles (ADVs) or autonomous vehicles (AVs), electrical and electronic distribution systems (EDSs) of passenger and commercial vehicles are expected to incur a dramatic change with the need to incorporate more safety and security features. For instance, more diagnostics may be mandatory for each function and each component of the vehicle. Furthermore, these ADVs include a telematics connection that enables the vehicle to access remote services and further enables the use of applications that are executed outside of the vehicle on an almost real-time basis.

Demands may require for ADVs to detect a possible failure as soon as possible, in some cases, even before the actual failure occurs. The embodiments as set forth herein provide a system and method to learn and monitor the "health" of the EDS in the vehicle and to compute the likelihood of failure before the failure actually occurs.

Figure 1:
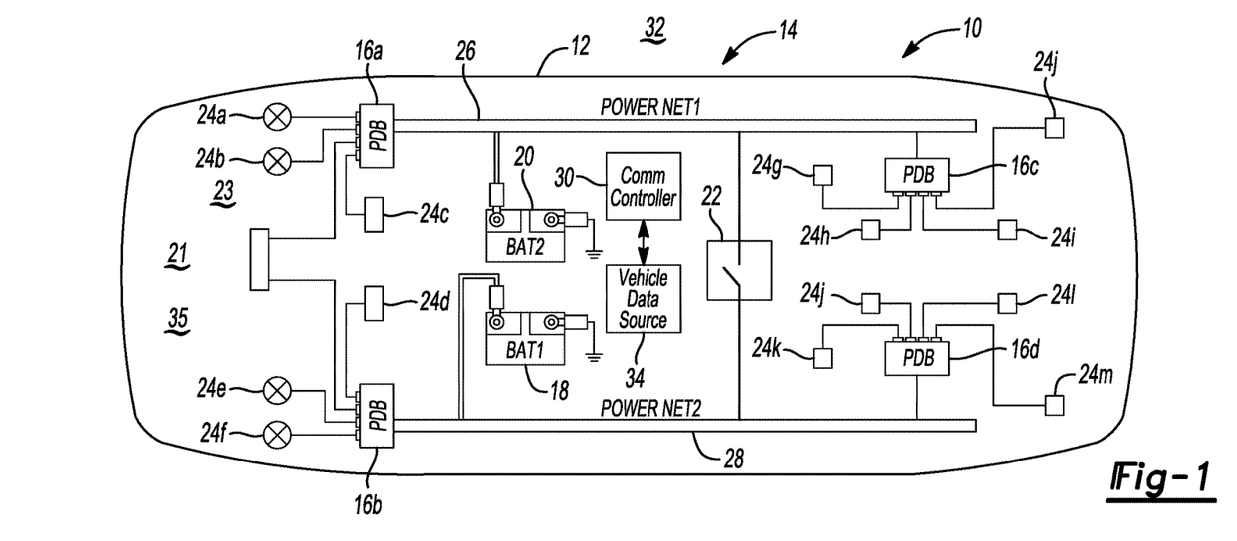
FIG. 1 depicts a health self-learning system for diagnosing an electrical distribution system (EDS) for a vehicle in accordance to one embodiment.

FIG. 1 depicts a health self-learning system 10 for diagnosing an electrical distribution system (EDS) 12 for a vehicle 14 in accordance to one embodiment. The system 10 generally includes a plurality of power distribution boxes (PDBs) 16a-16d (or "16"), a first battery 18, a second battery 20, and a power net switch 22. The PDBs 16a and 16c receive power for the first battery 18 and the PDBs 16b and 16d receive power from the second battery 20. Each PDB 16a-16d may include any number of fuses or relays (e.g., solid-state relays that are constructed using metal-oxide semiconductor field-effect transistors (MOSFETs)(not shown)) for providing the power from the first battery 18 and the second battery 20 to various loads 24a-24m (e.g., lights, motors, and/or vehicle controllers such as a smart junction box (SJB), a body central controller (BCC), a body domain controller (BDC), and/or a vehicle domain controller (VDC) in the vehicle 14).

Each PDB 16 may include any number of MOSFETS having a number of outputs. Advanced vehicle architectures may require that diagnostics are required for each output and that current and voltage measurements are performed on the outputs. Thus, each PDB 16 may monitor and record different characteristics related to the activity of the controller or load 24 that is controlled by a particular PDB 16. Each PDB 16 may obtain a time series of values that represent a behavior for the specific load 24 that each PDB 16 controls. For example, when the MOSFET of a particular PDB 16 is activated, several variables (or characteristics) may be measured such as gate current, load current, switching time, and/or, power dissipation, etc.

With ADVs, the power net switch 22 is generally provided for safety purposes. The power net switch 22 is configured to connect or disconnect a first power net 26 to and from a second power net 28. The first power net 26 generally corresponds to an electrical bus that is electrically coupled to the second battery 20, PDB 16a, and the PDB 16c. The second power net 28 generally corresponds to an electrical bus that is electrically coupled to the first battery 18, the PDB 16b, and the PDB 16d. Under some situations, it is necessary to disconnect the first power net 26 from the second power net 28.

With ADVs, it may be necessary to detect a failed operation of several subsystems. Even in the lowest ADV level, such as a Society of Automotive Engineering (SAE)—level 3 for autonomous vehicles, the driver/passenger is not required to supervise the vehicle and may simply respond to a take-over-request (TOR) from the vehicle. If the driver does not respond to the TOR, the vehicle has to reach a safe driving state (e.g., vehicle must reach a stop state). Therefore, the vehicle must provide vehicle steering and braking that can be controlled through an electrical capacity and is generally manual. The vehicle provides some form of sensing, fusion and decision making such that the vehicle can reach the safe state. A fail operational power supply is generally needed. Such a fail-operational supply may be achieved using redundancy (e.g., two power supplies such as the first battery 18 and the second battery 20 and two power nets such as the first power net 26 and the second power net 28). In general, the power net switch 22 between the two power nets (or the first power net 26 and the second power net 28) is used to equalize the power between the first battery 18 and the second battery 20 and to avoid failure propagation between first power net 26 and the second power net 28 in the case of a failure for either of the nets 26, 28 (e.g., a short circuit in one of the first power net 26 and the second power net 28).

It is recognized that the power net switch 22 may also constructed with MOSFET based technology. The ability to perform diagnostics on the power net switch 22 may also be generally required for ADVs. For example, it may be necessary to measure and report out current and voltage measurements on the power net switch 22. The power net switch 22 is generally a semiconductor-based switch that utilizes MOSFET(s). A failure mode diagnosis of MOSFETs may be required to achieve various requirements for the vehicle 14. The MOSFET based switches may have two failure modes. For example, the switch 22 may either be closed or in an open state. There are various failure mechanisms that can lead to MOSFETs remaining in an open or closed state. Such failures may include a bond wire lift off, a faulty solder joint, overstress, etc. A common failure mechanism that affects MOSFETS is attributed to aging and usage. To detect any of these failures, different diagnosis measurements need to be considered. In general, a MOSFET that is in an open condition may not be deemed as a priority whereas a closed MOSFET may lead to a short circuit condition. If the power net switch 22 is in the open state (or remains in the open state), the vehicle 14 may be required to act accordingly based on the resulting redundancy and energy supply. A power net switch 22 that remains closed may be an issue, however this may be related to overstress of the device. To detect this type of fault, electrical circuitry is required to perform additional diagnosis tasks. Such tasks may involve measuring key characteristics of the MOSFET (e.g., the power net switch 22).

It is recognized that each PDB 16 may have its own current or voltage measuring device for monitoring and recording the current or voltage measurements to obtain values or variables such as the gate current, load current, and/or power dissipation measurements. In addition, each PDB 16 includes a microprocessor and memory for storing information corresponding to the values or variables. Measurements of the values or variables for the power net switch 22 may be performed by one or more of the PDBs 16.

A communication controller 30 may be electrically coupled to each of the PDBs 16 for receiving information corresponding to their respective values or variables. In addition, the communication controller 30 may also receive information corresponding to the values or variables of the power net switch 22. It is recognized that each of the PDBs 16 may be electrically coupled to the communication controller 30 via a data communication bus such as, but not limited, to a controller area network (CAN). The communication controller 30 is generally configured to transmit the values or variables for various PDBs 16 and/or the power net switch 22 to a remote server 32 (i.e., a server external to the vehicle 14) via WI-FI® (i.e., Wireless Local Area Network (WLAN)) or cellular communication (i.e., Wide Area Network (WAN)), etc. A vehicle data source (or vehicle memory) 34 is coupled to the communication controller 30 to store the values or variables for the PDBs 16 and/or the power net switch 22. The communication controller 30 may periodically capture the information and transmit the same to the remote server 32. The remote server 32 is generally configured to learn and build a health system for the electrical distribution system (EDS) of the vehicle 14 (or for the MOSFETs utilized in the PDBs 16 and in the power net switch 22).

Figure 2:
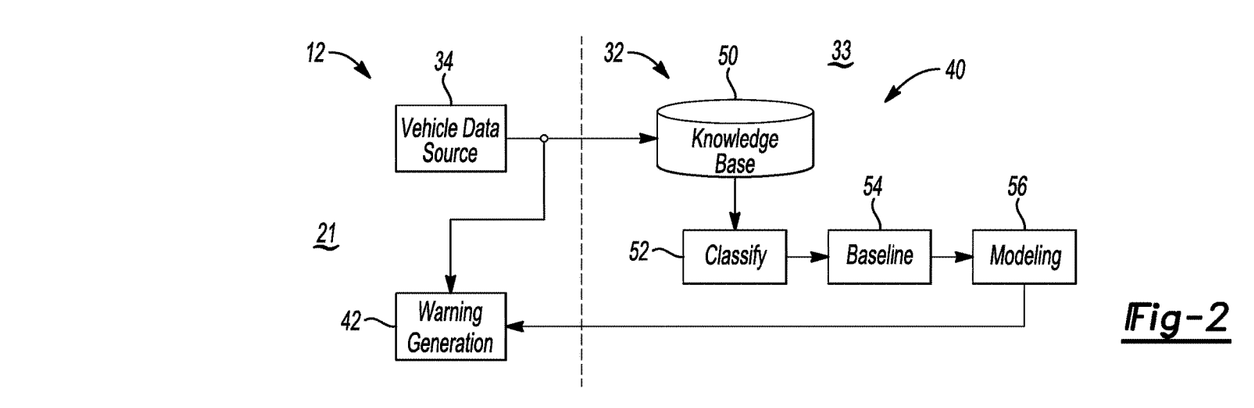
FIG. 2 depicts a block diagram of a health learning system for a vehicle in accordance to one embodiment.

FIG. 2 depicts a block diagram of a health learning system 40 for the vehicle 14 in accordance to one embodiment. The system 40 generally includes aspects (e.g., components) related to the vehicle 14 and to the remote server 32. The remote server 32 utilizes the values for the PDBs 16 and/or the power net switch 22 to build a learning health system for the EDS (or the power distribution) of the vehicle 14. The remote server 32 includes a knowledge database 50 and at least one controller 33 (e.g., a microprocessor-based controller with memory that stores and executes software) to perform analysis and to model the behavior of the various PDBs 16 and/or the power net switch 22 to evaluate baseline values (e.g., normal and expected values). It is recognized that the remote server 32 may be electrically coupled to any number of vehicles 14. The remote server 32 may also provide information to the vehicle 14 for generating a warning 42 at any controller positioned in the vehicle 14 in moments in which a failure may occur with respect to the various MOSFETs in the PDBs 16 and/or in the power net switch 22. In general, the vehicle 14 may generate the warning 42 which can be audible and/or visual at any moment before a corresponding MOSFET reaches its Remaining Useful Life (RUL). When the warning 42 is set, the vehicle 14 may store a warning indication to provide to a user to have the vehicle 14 brought in for servicing upon a future visit to a service center. Alternatively, the vehicle 14 may generate the warning 42 to the user to request servicing (i.e., travel to a servicing center) within a predetermined time frame. The predetermined time frame may coincide to a moment in time that is just prior to the MOSFET reaching the end of its corresponding RUL (e.g., a predetermined number of days or weeks prior to the end of the RUL). In addition, the vehicle 14 may generate an alarm to disable/disconnect the corresponding MOSFET when the RUL is close to an end of life of the MOSFET at the predetermined time. Also, the vehicle 14 may enter into a degraded mode (or fail-safe mode) whereby the use of the MOSFET is minimized to enable the user to reach a destination.

The remote server 32 may include a classify block 52 (or classification block 52), a baseline block 54, and a modeling block 56. The classification block 52 may perform identification and cataloguing of all data received from various vehicles 14 such as various characteristics related to load, operating time, operating temperature, etc. of the MOSFETs located in the vehicle 14. In this case, the classification block 52 distributes all data in homogenous sets regarding operating conditions. The baseline block 54 extracts the data as organized in the homogeneous sets as received from the classification block 52. For example, the baseline block 54 extracts the typical, normal, or average behavior for various characteristics (e.g., MOSFET resistance) of the MOSFETs in the PDBs 16 and/or in the power net switch 22 for each vehicle 14 that communicates with the remote server 32. The data may be used as a basis for comparison with subsequently received data. The modeling block 56 models predicted variations of the characteristics for the MOSFETs in the PDBs 16 and/or in the power net switch 22.

While the knowledge database 50 is shown positioned within the remote server 32, it is recognized that the knowledge database 50 may be positioned within a controller of the vehicle 14. The vehicle 14 may transmit the values or variables for the PDBs 16 and/or the power net switch 22 on a periodic basis to the remote server 32. In another example, the vehicle 14 may transmit the values for the PDBs 16 and/or the power net switch 22 via a hardwired connection to a diagnostic tool that is used by a technician to troubleshoot vehicle issues.

With the PDBs 16 and/or the power net switch 22, MOSFETs positioned therein play an instrumental role to the proper operation of the vehicle. The failure of any of the MOSFETS may lead to the vehicle 14 losing vehicle functionality. For example, consider high side MOSFETS that drive inductance loads (such as for an injector coil in a diesel engine system). As the current cannot decay to zero instantaneously through an inductance, a source-drain voltage increases to take the MOSFET into avalanche breakdown. The energy stored in the inductance is then dissipated in the MOSFET which can damage the MOSFET. In addition, MOSFETS may fail due to extrinsic failures such as a short-circuit in the wiring. Therefore, by monitoring various characteristics related to the performance of the MOSFETs, an estimation of device aging and degradation of the MOSFETs may be obtained. For example, the on-resistance of the various MOSFETS may change (e.g., the on-resistance for the MOSFET may change (or age) over time). Thus, power dissipation that is directly related to the on-resistance may be an indicator as to the overall health of one or more MOSFETs. Also, when a gate of the MOSFET is damaged, the MOSFET will generate a significantly higher current. Therefore, these variables can be observed to track degradation and aging of the MOSFET. It is possible to compute the RUL of the MOSFETs at any point in time. Estimation of the RUL ensures the reliability of the MOSFET(s) for the safety of system.

To compute the RUL in the vehicle 14 or in some embodiments, at the remote server 32, the modeling block 56 of the remote server 32 may employ a degradation model in relation to the various MOSFET characteristics such as for example the variation or change of MOSFET resistance while the MOSFET is in the ON state and/or the variation (or change) of the MOSFET gate current given by a driver to driver the MOSFET. In most cases, the degradation model may utilize only time (t) as a main variable. For example, one may consider the degradation model for the MOSFET on-resistance as follows:

$$\Delta R_{on} = \beta \cdot e^{\theta/time_{opt}} \qquad (EQ. 1)$$

$\Delta R_{on}$ generally corresponds to a change (or variation) of MOSFET on-resistance due to aging, $time_{opt}$ is an operation time of the MOSFET; and $\beta$ and $\theta$ are model parameters. During the period of RUL prediction, to ensure the accuracy of prediction, a re-estimation of the parameter of degradation model may be needed.

However, since PDBs 16 and their MOSFETs may be equipped in many vehicles that can operate in very different conditions, the degradation model as set forth in equation 1 may be insufficient. In a real vehicular environment, operating temperature, operating time, and power dissipation may influence the aging of the component (e.g., MOSFET). Therefore, the system 40 employs a two-variable model (or degradation model) that considers the operation time and the operation temperature of the MOSFET as set forth below.

$$\Delta R_{on} = \beta \cdot e^{\theta/time_{op}} \cdot e^{\gamma/Temp_{op}} \qquad (EQ. 2)$$

Figure 4:
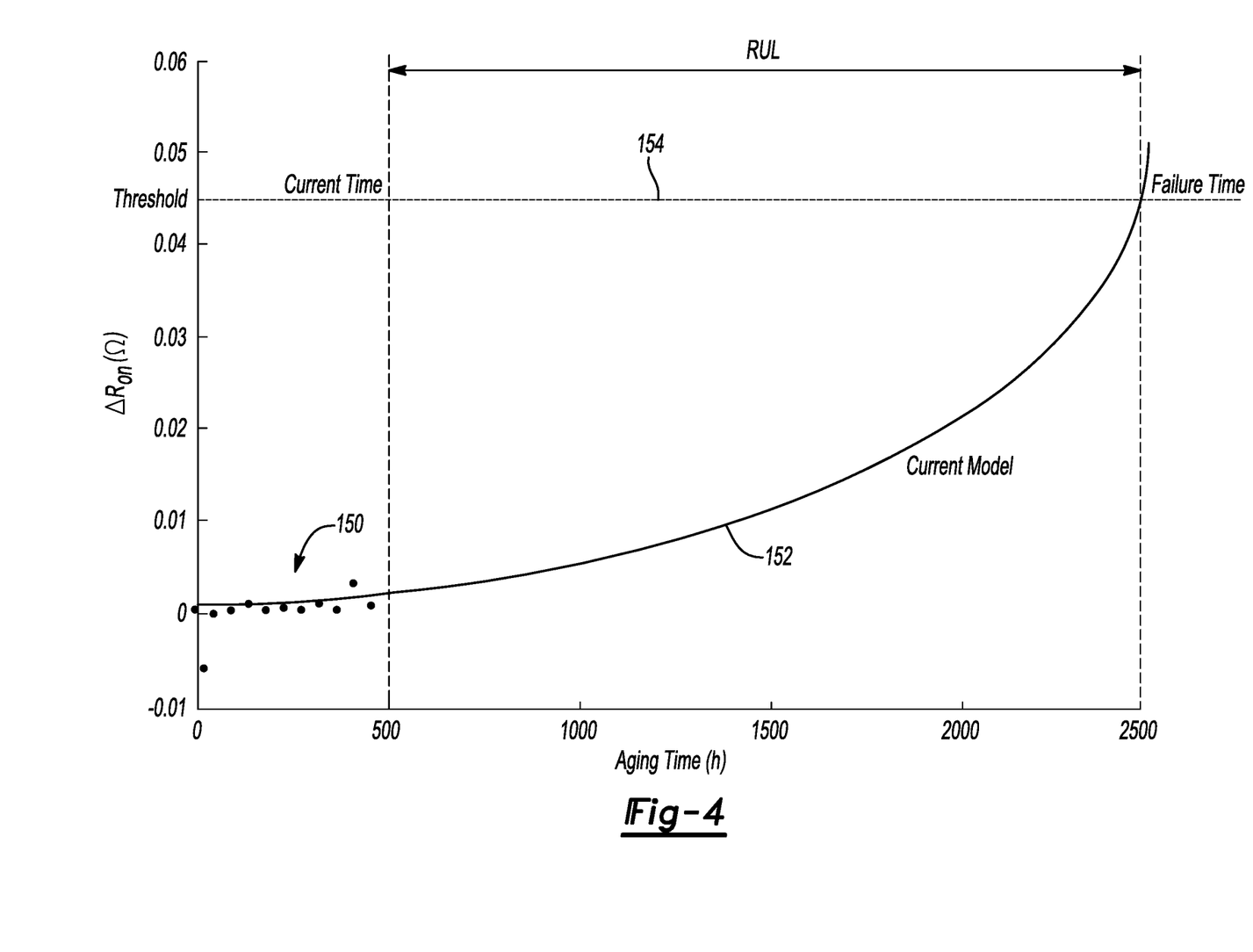
FIG. 4 depicts one plot of MOSFET on-resistance due to aging.

$\Delta R_{on}$ generally corresponds to a change of MOSFET on-resistance due to aging, $time_{op}$ is an operation time of the MOSFET, $Temp_{op}$ is operation temperature of the MOSFET, and β and θ and γ are model parameters. At least one microcontroller 21 (the microcontroller 21 hereafter) that is positioned in any of the PDBs, the communication controller 30, or the vehicle data source 34 (or other controllers within the vehicle 14) monitor operation time, operation temperature, and an increase in resistance of the MOSFETs in the PDBs 16 and/or the power net switch 22. For example, the microcontroller 21, in addition to temperature, voltage, and/or current sensors 23 may obtain such information of the MOSFETs in the PDBs 16 and/or the power net switch 22. This information is processed and transmitted to the communication controller 30. The communication controller 30 then transmits the same to the remote server 32. During the period of RUL prediction, to ensure the accuracy of prediction, re-estimation of the parameter of degradation model may be needed. For example, the remote server 32 updates the degradation model $\Delta R_{on}$ and transmits the updated values for $\Delta R_{on}$ back to the vehicle 14. The microcontroller 21 in the vehicle 14 estimates the RUL and predicts a time when the corresponding MOSFETs in the PDBs 16 and/or the power net switch 22 will fail based on $\Delta R_{on}$, $time_{op}$, and the model parameters as illustrated in FIG. 4. For example, the microcontroller 21 utilizes $\Delta R_{on}$ using the MOSFET values in the vehicle 14 of the temperature and operation time to determine the RUL. The vehicle 14 stores values corresponding to the actual end of life for each MOSFET therein to estimate the RUL based on the update values for $\Delta R_{on}$.

The re-estimation of the values of the parameters of the two-variable model is performed using the information coming from all vehicles that carry the same type of MOSFETs. The two-variable model may correspond to $time_{op}$ (e.g., an operation time of the MOSFET) and $Temp_{op}$ (an operation temperature of the MOSFET). Thus, the remote server 32 is configured to execute the model for any number of vehicles that include the PDBs 16 with MOSFETs and the power net switch 22. It is recognized that the remote server 32 may execute the two-variable model for each MOSFET for the corresponding PDB 16 and the power net switch 22 in the vehicle 14. For the remote server 32 to execute the bi-dimensional model for a large number of vehicles, the values (e.g., the change of MOSFET on-resistance due to aging, operation time of the MOSFET, operation temperature of the MOSFET) coming from all vehicles is transmitted from each vehicle 14 on a periodic basis and processed, periodically, by the remote server 32. Due to the characteristics of the noted values directly above, the classification of such data is performing by the remote server 32 that executes a serial clustering algorithm. In this way, device that age are segmented by operating time and operating conditions, and not only by operating time of the MOSFET.

The vehicle 14 transmits the data anonymously to the remote server 32. After classification and re-estimation of model parameters, the results are sent back to all vehicles. With this information, the vehicle 14 can evaluate if the behavior of the MOSFET(s) deviate significantly from the behavior of MOSFET(s) in the same operating cluster and generates the warning 42 via the microcontroller 21. If the MOSFET(s) behave as expected, the microcontroller 21 generates the warning 42 (as noted above) when the estimated RUL is lower than a certain threshold. In both cases, the driver could be informed and take appropriate actions before the corresponding MOSFET reaches its corresponding RUL. In general, MOSFETs may be in a similar operating cluster with one another if such MOSFETs operate under the same usage such as if the MOSFETs operate under similar temperatures, provide similar current output capabilities, and/or exhibit similar operating times, etc. In one example, consider MOSFETs that are used as battery switches in any number of vehicles. In general, these MOSFETs may experience a similar environment and usage condition since the MOSFETs are expected to behave similarly, and therefore, the MOSFETs may be classified in the same cluster.

It is recognized that MOSFETs that are used in private vehicles and in similar locales or locations may be classified in different clusters because the operation time of the MOSFET will differ for each vehicle. However, MOSFETs used in commercial delivery vehicles, fleet vehicles, etc. and in a similar locale, may have a similar operation time and may have the same cluster. Whereas, MOSFETs used in commercial delivery vehicles, fleet vehicles, etc. in different locales; such MOSFETs may be classified into different clusters.

Figure 3:
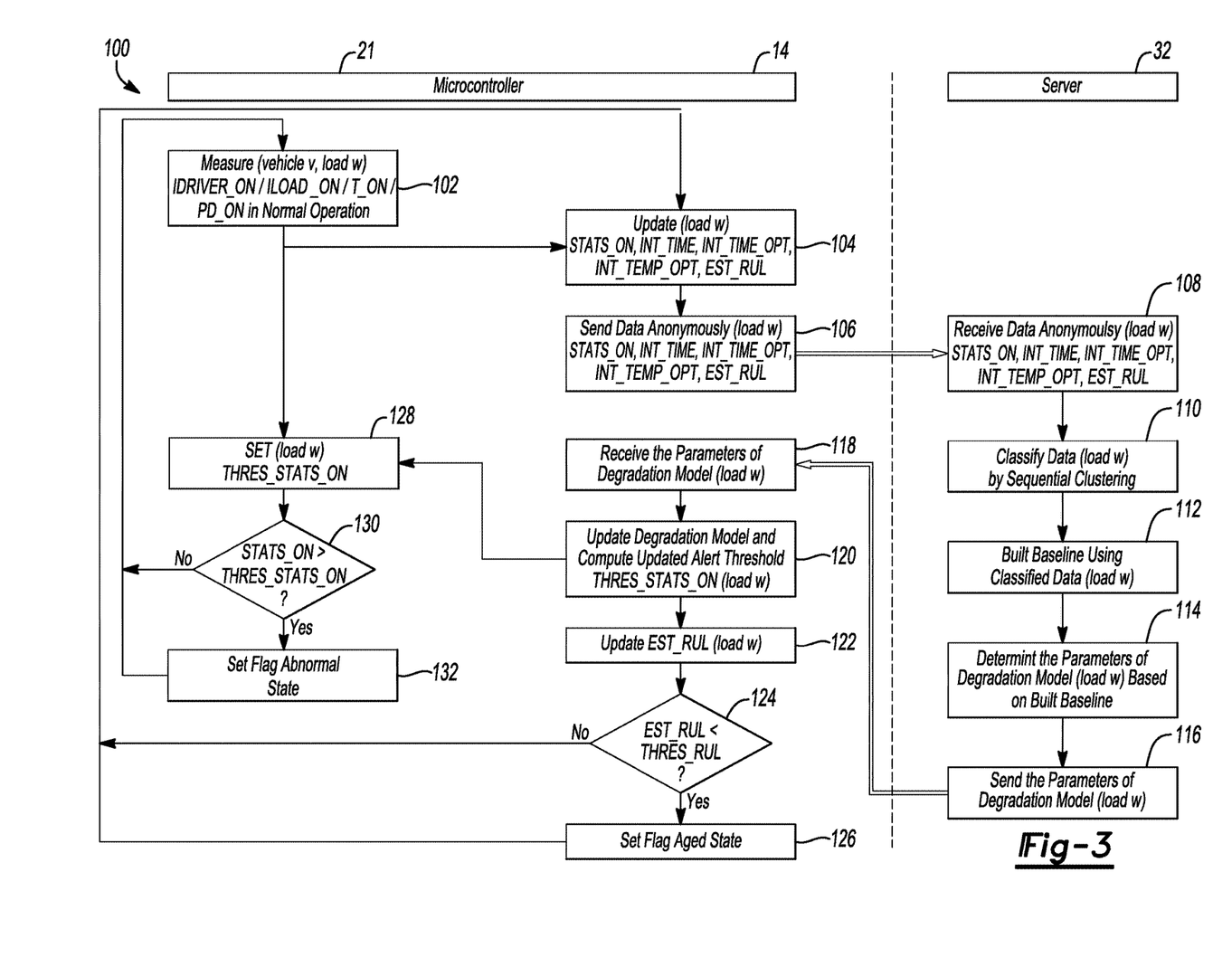
FIG. 3 depicts a health self-learning method for diagnosing an EDS for a vehicle in accordance to one embodiment.

FIG. 3 depicts a health self-learning method 100 for diagnosing MOSFETS for the PDBs and/or the power net switch 22 for the vehicle 14 in accordance to one embodiment. FIG. 3 generally illustrates that either the microcontroller 21 (or the vehicle 14) execute some aspects of the method 100 and the remote server 32 executes other aspects of the method 100.

In operation 102, the microcontroller 21 in the vehicle 14 measures, for one or more MOSFETs, values: IDRIVER_ON (e.g., the current given by a driver to drive the MOSFET), ILOAD_ON (e.g., the current through the MOSFET (v,w) when the MOSFET is ON), PD_ON (e.g., power dissipated by the MOSFET (v,w) when the MOSFET is ON) in normal operation. In general, a driver 35 for driving the MOSFET (e.g. the MOSFETs for the PDBs 16 or the power net switch 22) is provided that accepts a low-power input from the microcontroller 21 to produce a high-current drive input for a gate of the MOSFET. In general, the driver 35 may be integrated with each MOSFET in the same package for medium-power MOSFETS. However, for high power MOSFETS (e.g., MOSFETS used for battery switching devices such as the power net switch 22), a separate driver 35 may be provided. In the case of IDRIVER_ON (e.g., the current applied to a gate of the MOSFETs) which activates the MOSFETs, the microcontroller 21 measures the current, via a current sensor, being generated by the MOSFET that is activated in response to the current being applied to the MOSFET. Therefore, in this case, the microcontroller 21 obtains values for the IDRIVER_ON and the ILOAD_ON for the high power MOSFET as used as the power net switch 22. All references to the microcontroller 21 that performs an operation in the method 100 will be referred to singularly. It is recognized that one or more of the microcontrollers 21 in the vehicle 14 may perform a similar operation.

In operation 104, the microcontroller 21 updates STATS_ON which corresponds to different MOSFETs characteristics that may be used for prognostics of the health of the MOSFET. For example, the system 10 may use the variation of change of MOSFET resistance while in an ON state measured for each MOSFET (v,w) as defined as $INT\_\Delta R_{on}$ and/or the variation of MOSFET gate current given by a driver to drive each MOSFET (v,w). The microcontroller 21 may also update other variables such as INT_TIME (e.g., total amount of time the vehicle 14 is in operation), INT_TIME_OPT (e.g., total amount of time the MOSFET (v,w) is in operation), INT_TEMP_OPT (e.g., accumulated average temperature (v,w) for MOSFET is in operation), and an Estimated Remaining Useful Life (RUL) for the MOSFET. In general, variable INT_TIME_OPT corresponds to time$_{opt}$ as noted in connection with Eq. 2, INT_TEMP_OPT corresponds Temp$_{op}$ as noted above in connection with Eq. 2, and INT_$\Delta R_{on}$ corresponds to $\Delta R_{on}$ as noted above in connection with Eq. 2. The microcontroller 21 determines the RUL by subtracting a current time from the time when a predicted $\Delta R_{on}$ crosses a failure threshold. Different MOSFET devices may undergo differing degradation processes (due to different operating conditions). The microcontroller 21 transmits the same to the communication controller 30. Also, the RUL changes due to the modification of the model as more data is available (see FIGS. 4 and 5).

FIG. 4 illustrates one manner for determining the RUL for a given MOSFET at a given time (e.g., 500 h). Measured INT_$\Delta R_{on}$ values of the particular MOSFETs are generally illustrated as element 150. A solid line (or curve) 152 provides an estimated (baseline or threshold) $\Delta R_{on}$ variation computed using the model created by analyzing the data sent by the vehicles with MOSFETs that have been classified in the same cluster. The microcontroller 21 uses the latest measured INT_$\Delta R_{on}$ and determines which aging time, the measured INT_$\Delta R_{on}$ value will coincide with the $\Delta R_{on}$ value given by the model as provided by the remote server 32. In the example in FIG. 4, both values (the measured INT_$\Delta R_{on}$ value and the $\Delta R_{on}$ value predicted by the model) coincide and, therefore, the aging time of the MOSFET coincides with the aging time in the model. The microcontroller 21 determines RUL by obtaining the difference between this aging time and the failure time predicted by the model. The failure time corresponds to the time when the solid line (or curve) 152 crosses a threshold value 154. The vehicle 14 (i.e., the microcontroller 21 and/or vehicle data source 34, etc.) may store values corresponding to the threshold value 154 for each MOSFET in the vehicle 14.

Figure 5:
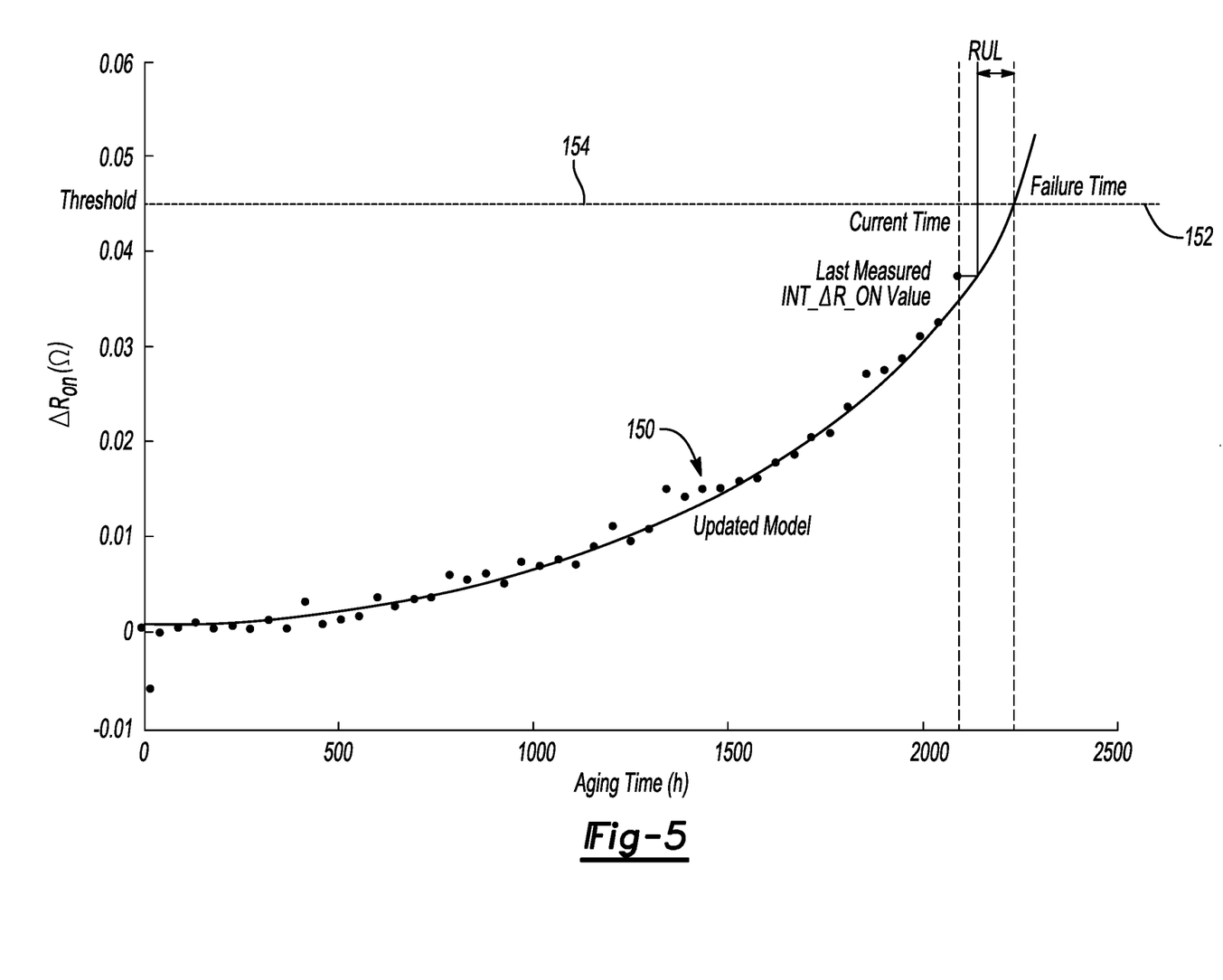
FIG. 5 depicts another plot of MOSFET on-resistance aging after modeling is performed on a remote server in accordance to one embodiment.

FIG. 5 illustrates the manner in which the microcontroller 21 determines the RUL for a given MOSFET in accordance to one embodiment. In this case, measured INT_$\Delta R_{ON}$ values of the particular MOSFETs is also shown as element 150. At an aging time of 2100$h$, the remote server 32 has recomputed the model to predict the RUL. The microcontroller 21 determines the latest measured INT_$\Delta R_{ON}$ for a particular MOSFET and compares the latest measured INT_$\Delta R_{ON}$ with a value predicted by the updated model that has been sent from the server 32. Since more data is available, the remote server 32 may recompute the model to predict the RUL. In the example illustrated in FIG. 5, this particular MOSFET has slightly more "$\Delta R_{on}$" than the value predicted by the model, e.g., "aged". The microcontroller 21 determines the RUL by evaluating the time when the predicted $\Delta R$ variation crosses the threshold value 154 starting from last measured INT_$\Delta R_{ON}$ value. The curve (corresponding to the mathematical modeling) in FIG. 5 (e.g., see element 150) is slightly different to the curve 152 in FIG. 3. The condition occurs since the baseline is computed using more data. In other words, the system 10 has learned more and the prediction is better based on the updated model or $\Delta R_{on}$ as provided by the remote server 32.

In operation 106, the vehicle 14 (or communication controller 30) transmits the data corresponding to the STATS_ON, INT_TIME, INT_TIME_OPT, INT_TEMP_OPT, and the RUL to the remote server 32. This information is sent anonymously to the remote server 32 for privacy issues as they related to the vehicle owner or driver/passenger. For example, the vehicle 14 may employ a NEVADA concept ("NEVADA") for ensuring privacy concerns. NEVADA provides a framework for the collection of vehicle-generated data. Data collected by the remote server 32 (or data transmission by the communication controller 30) may be triggered by pre-defined events and the collected data may be transferred to a manufacturer's server (i.e., the remote server 32) at pre-defined times. The NEVADA concept enables service providers and neutral services to request an activation of the pre-defined events in vehicle routines. For example, the vehicle 14 may transmit the data corresponding to the STATS_ON, INT_TIME, INT_TIME_OPT, INT_TEMP_OPT, and the RUL to the remote server 32 periodically, every 24 hours. In another example, every time the vehicle 14 stops for more than two hours, the vehicle 14 may transmit the foregoing data to the remote server 32. In another example, the remote server 32 may transmit a command to the vehicle 14 to control the vehicle 14 to transmit the foregoing data to the remote server 32.

In operation 108, the remote server 32 receives the data corresponding to the STATS_ON, INT_TIME, INT_TIME_OPT, INT_TEMP_OPT, and the RUL from the vehicle 14.

In operation 110, the remote server 32 classifies the data corresponding to the STATS_ON, INT_TIME, INT_TIME_OPT, INT_TEMP_OPT, and the RUL utilizing sequential clustering (or clustering). For example, the classification block 52 identifies and catalogues all of the data received from the vehicle 14 in terms of the different characteristics such as load, operating time, operation temperature, etc. The classification block 52 distributes all data in homogenous sets regarding operation conditions.

Sequential clustering is generally an unsupervised method used to classify data in a certain number of homogenous data sets (or clusters.) In this case, the number of clusters is not predetermined, but grows gradually (one after another) in a sequence, according to a given criterion, until appropriate stopping conditions are satisfied. The advantages of the sequential clustering algorithms are twofold. First, the redundant computations for unnecessary large number of clusters are avoided. Second, the clusters are usually extracted in an ordered sequence, starting from the most significant cluster (the cluster with the largest volume) to the least significant (the smallest volume) cluster. Such representation of the clustering results is helpful for operation 112.

In operation 112, the remote server 32 builds a baseline with the classified data. For example, the baseline block 54 receives the homogenous sets of data from the classification block 52 in homogenous conditions and extracts (for each data set for a particular characteristic of the MOSFET) the typical, normal, and average behavior of the elements related to a certain characteristic (e.g., such as MOSFET resistance). The average values may be used as a basis for comparison with subsequently acquired data.

In operation 114, the remote server 32 determines various parameters of the degradation model based on the built baseline of operation 112. For example, if the MOSFET characteristic used for prognosis is the variation or change of MOSFET resistance in an ON state, the remote server 32 determines model parameters the model parameters $\beta$ and $\theta$ and $\gamma$ as set forth in Eq. 2. Likewise, the modeling block 56 models a calculated/estimated variation of the MOSFET characteristic in the future by matching the baseline data to a mathematical model.

In operation 116, the remote server 32 transmits the parameters of the degradation model to the vehicle 14.

In operation 118, the communication controller 30 receives the parameters of the degradation model from the remote server 32 and transmits the same to the microcontroller 21.

In operation 120, the microcontroller 21 updates the degradation model and computes an updated alert threshold (i.e., THRES_STATS_ON (e.g., computed using data for all other devices working in similar conditions, i.e., devices classified in the same cluster)) used to detect an abnormal value) for any one or more of the MOSFETs.

In operation 122, the microcontroller 21 updates the estimated RUL (or EST_RUL).

In operation 124, the microcontroller 21 compares the estimated RUL to a THRES_RUL which corresponds to a threshold that is computed using the parameters of degradation model based on built baseline from measured data. If the estimated RUL is greater than the THRES_RUL, then the method 100 moves to operation 126. If not, then the method 100 moves to operation 104.

In operation 126, the microcontroller 21 sets a flag that a MOSFET for a particular PDB 16 has aged. In this case, the vehicle 14 alerts the user that the affected MOSFET for a particular PDB 16 and/or for the power net switch 22 exhibits a fault.

In operation 128, the microcontroller 21 sets THRES_STATS_ON which corresponds to a $\Delta R_{on}$ threshold (computed using data for all other MOSFET(s) working in similar conditions, i.e., MOSFET(s) classified in the same cluster (e.g., MOSFETs that are used within PDBs or battery switches, etc.) used to detect an abnormal value.

In operation 130, MOSFET(s) determines whether STATS_ON (i.e., the $\Delta R_{on}$ measured for MOSFET (v,w)) is greater than THRES_STATS_ON (i.e., $\Delta R_{on}$ threshold (computed using data for all other devices working in similar conditions, i.e., devices classified in the same cluster) used to detect an abnormal value). If STATS_ON is greater than THRES_STATS_ON, then the method 100 moves to operation 132. If not, then the method 100 moves to back to operation 102.

In general, the values for MOSFETS related to PDBs 16 and the power net switch 22 may be sent anonymously from the vehicle to the remote server 32. After classification and re-estimation of model parameters, the remote server 32 transmits the results to all vehicles that it initially receives information from with respect to the MOSFETS for the PDBs 16 and the power net switch 22. With this information, each vehicle 14 may evaluate whether the behavior for its MOSFETS used in connection with the PDBs 16 and/or the power net switch 22 deviates significantly from the behavior of MOSFETS that operate in the same cluster and generate an alarm. If the MOSFET behaves as expected, an alarm may be generated when the estimated RUL is lower than a certain threshold. In both cases, the driver could be informed and take appropriate actions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for adaptively performing diagnostics in a vehicle, the apparatus comprising:
at least one microcontroller positioned in a vehicle and being configured to provide first information indicative of operating characteristics for at least one switch in the vehicle, and
a communication controller configured to:
receive the first information from the at least one microcontroller,
wirelessly transmit the first information to a remote server;
receive second information related to a remaining useful life (RUL) for the at least one switch from the remote server based on the first information; and
transmit the second information to the at least one microcontroller to determine when the at least one switch will exhibit a failure based on the second information.

2. The apparatus of claim 1, wherein the at least one switch is a metal-oxide semiconductor field-effect transistor (MOSFET).

3. The apparatus of claim 2, wherein the first information includes a total operating time of the MOSFET and an operating temperature of the MOSFET.

4. The apparatus of claim 2, wherein the RUL is based on a change of resistance attributed to the MOSFET.

5. The apparatus of claim 1, wherein the first information further includes at least one of a change in resistance for the at least one switch, a change of driver current for the at least one switch, or an accumulated average temperature.

6. The apparatus of claim 1, wherein the microcontroller is further configured to receive the second information and to determine the RUL for the at least one switch based on the second information.

7. A computer-program product embodied in a non-transitory computer read-able medium that is programmed for adaptively performing diagnostics in a vehicle, the computer-program product comprising instructions for:
receiving first information indicative of operating characteristics for at least one switch in the vehicle;
wirelessly transmitting the first information to a remote server;
receiving second information related to a remaining useful life (RUL) for the at least one switch from the remote server based on the first information; and
determining, at the vehicle, when the at least one switch will exhibit a failure based on the second information.

8. The computer-program product of claim 7, wherein the at least one switch is a is a metal oxide semiconductor field-effect transistor (MOSFET).

9. The computer-program product of claim 8, wherein the first information includes a total operating time of the MOSFET and an operating temperature of the MOSFET.

10. The computer-program product of claim 8, wherein the RUL is based on a variation of resistance attributed to the MOSFET.

11. The computer-program product of claim 7, wherein the first information further includes at least one of a change in resistance for the at least one switch, a change of driver current for the at least one switch, or an accumulated average temperature.

12. The computer-program product of claim 7 further comprising instructions for determining the RUL for the at least one switch based on the second information.

13. The computer-program product of claim 7, wherein the computer-program product further includes instructions for providing a warning to a user at a predetermined time before the at least one switch reaches a corresponding end of life thereof.

14. An apparatus for adaptively performing diagnostics, the apparatus comprising:
a memory; and
a remote server including the memory and being configured to:

wirelessly receive first information indicative of operating characteristics for at least one switch from a plurality of vehicles;
generate second information related to a remaining useful life (RUL) for the at least one switch for the plurality of vehicles based on the first information; and
wirelessly transmit the second information to the plurality of vehicles to determine when the at least one switch will exhibit a failure for each corresponding vehicle of the plurality of vehicles,
wherein the first information further incudes at least one of a change in resistance for the at least one switch, a change of driver current for the at least one switch, or an accumulated average temperature.

15. The apparatus of claim 14, wherein the at least one switch is a metal oxide semiconductor field-effect transistor (MOSFET).

16. The apparatus of claim 15, wherein the first information includes a total operating time of the MOSFET and an operating temperature of the MOSFET.

17. The apparatus of claim 15, wherein the RUL is based on a change of resistance attributed to the MOSFET.

18. The apparatus of claim 14, wherein remote server includes a classification block that is configured to sequentially cluster the first information from the plurality of vehicles based on whether the at least one switch for each vehicle of the plurality of vehicles exhibit at least one of similar operating temperatures, similar current output capabilities, or similar operating times.

19. The apparatus of claim 18, wherein the remote server is further configured to transmit a command to the plurality of vehicles to receive the first information.

* * * * *